United States Patent
Mohan et al.

(10) Patent No.: US 8,610,773 B2
(45) Date of Patent: Dec. 17, 2013

(54) CCTV CAMERA HOUSING

(75) Inventors: Sudeep Mohan, Vancouver (CA); Natalia Elena Ursan, Burnaby (CA)

(73) Assignee: Honeywell International Inc., Morristown, NJ (US)

( * ) Notice: Subject to any disclaimer, the term of this patent is extended or adjusted under 35 U.S.C. 154(b) by 397 days.

(21) Appl. No.: 12/831,851

(22) Filed: Jul. 7, 2010

(65) Prior Publication Data

US 2012/0008041 A1    Jan. 12, 2012

(51) Int. Cl.
*H04N 7/18* (2006.01)
*H04N 5/225* (2006.01)
*G03B 17/00* (2006.01)

(52) U.S. Cl.
USPC .............. 348/143; 348/373; 396/427

(58) Field of Classification Search
USPC ........... 348/240.3, 333.06, 373, 375; 396/427
See application file for complete search history.

(56) References Cited

U.S. PATENT DOCUMENTS

| | | | |
|---|---|---|---|
| 6,509,926 B1 | 1/2003 | Mills | 348/143 |
| 6,527,000 B1 | 3/2003 | Randmae et al. | 134/99.1 |
| 6,742,942 B2 | 6/2004 | Hering | 396/427 |
| 7,000,883 B2 * | 2/2006 | Mercadal et al. | 248/660 |
| 7,217,045 B2 * | 5/2007 | Jones | 396/427 |
| 7,306,383 B2 | 12/2007 | Jones | 396/427 |
| 7,495,703 B2 | 2/2009 | Arbuckle | 348/375 |
| 7,586,537 B2 * | 9/2009 | Konishi et al. | 348/373 |
| 7,609,321 B2 | 10/2009 | Yamane | 348/373 |
| 7,612,799 B1 * | 11/2009 | Frank et al. | 348/164 |
| 7,710,452 B1 | 5/2010 | Lindberg | 348/149 |
| 2003/0030748 A1 * | 2/2003 | Jung | 348/373 |
| 2006/0177217 A1 | 8/2006 | Opmeer | 396/427 |
| 2006/0216020 A1 * | 9/2006 | Lang et al. | 396/427 |
| 2008/0055409 A1 * | 3/2008 | Mars et al. | 348/143 |
| 2009/0162048 A1 | 6/2009 | Tatewaki | 396/427 |
| 2009/0198099 A1 | 8/2009 | Myers | 600/117 |
| 2010/0033577 A1 | 2/2010 | Doak | 348/159 |
| 2010/0284081 A1 * | 11/2010 | Gutierrez et al. | 359/554 |

FOREIGN PATENT DOCUMENTS

WO    WO 2009/037599 A3    3/2009    ......... B65D 65/02

* cited by examiner

*Primary Examiner* — Trung Diep
(74) *Attorney, Agent, or Firm* — Husch Blackwell

(57) ABSTRACT

A camera housing incorporates a glass window, as an optical port, to improve image quality. The window can be curved or flat. The housing can be dome shaped and can also include metal or plastic along with the glass window. A camera installed in the housing has a field of view that intersects the window. The clear glass window enhances image quality when tilting or zooming the camera. A panning mechanism rotates the camera and housing together.

14 Claims, 1 Drawing Sheet

CCTV CAMERA HOUSING

FIELD

The invention pertains to housings for closed circuit television-like camera modules. More particularly, the invention pertains to such modules which include a camera housing where the housing includes a window of glass in the field of view of the camera.

BACKGROUND

Currently, known domes (bubbles) used as housings on PTZ (Pan/Tilt/Zoom) cameras are made of some sort of clear plastic material. Plastic is advantageous from the point of view of weight, manufacturing complexity, cost and strength.

Unfortunately, the best of the clear plastic materials available currently fall short on image quality when it comes to high definition and high zoom cameras. The plastic material is not clear enough and limits how high resolution and high zoom one can go. This poses a serious problem as we try to incorporate regular and high definition cameras with zoom ranges of 35x and more specially when these are becoming more main stream.

There is a need to improve image quality, especially in connection with high definition and high magnification, zoom, cameras.

DETAILED DESCRIPTION

Figure 1:
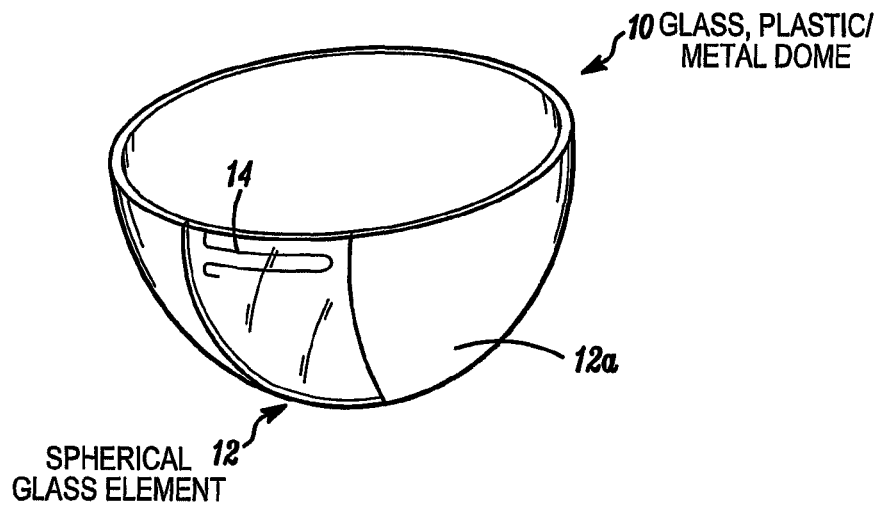
FIG. 1 illustrates an exemplary dome shaped housing in accordance with the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In one embodiment of the invention a hybrid housing, which could be shaped as a dome, is made of metal or opaque plastic. The housing incorporates a glass window that a camera can look through the window. Direct benefits of such an implementation include crystal clear images and any resolution and zoom.

Since the embodiment is a hybrid, the strength of metal or the light weight of plastic material can be obtained in the foundation of the housing. Further, the cost is more manageable as the size of the glass is limited to the viewing window.

A heating element could be incorporated in the glass window to prevent any moisture build up inside. This will eliminate the use of a heater and blower assembly thereby making the product more robust and reliable Indirect benefits:

In another aspect, the housing can be provided in any color without compromising the optical quality. Cleaning of the scratch resistant glass surface is easier than cleaning plastic. A broader operating temperature range is also available in PTZ applications FIG. 1 illustrates an exemplary multi-material housing, implemented as a dome, 10 in accordance with the invention. Housing 10 can be implemented in part with plastic and, or metal 12a. A spherical glass window or optical port, element 12, which could carry an electrical heater 14, is mounted in the housing 10.

Those of skill in the art will recognize that housings and associated optical windows having other shapes can embody and come within the spirit and scope of the invention. For example, windows having cylindrical, conic or flat shapes could be used with appropriately shaped housings all without limitation.

Figure 2:
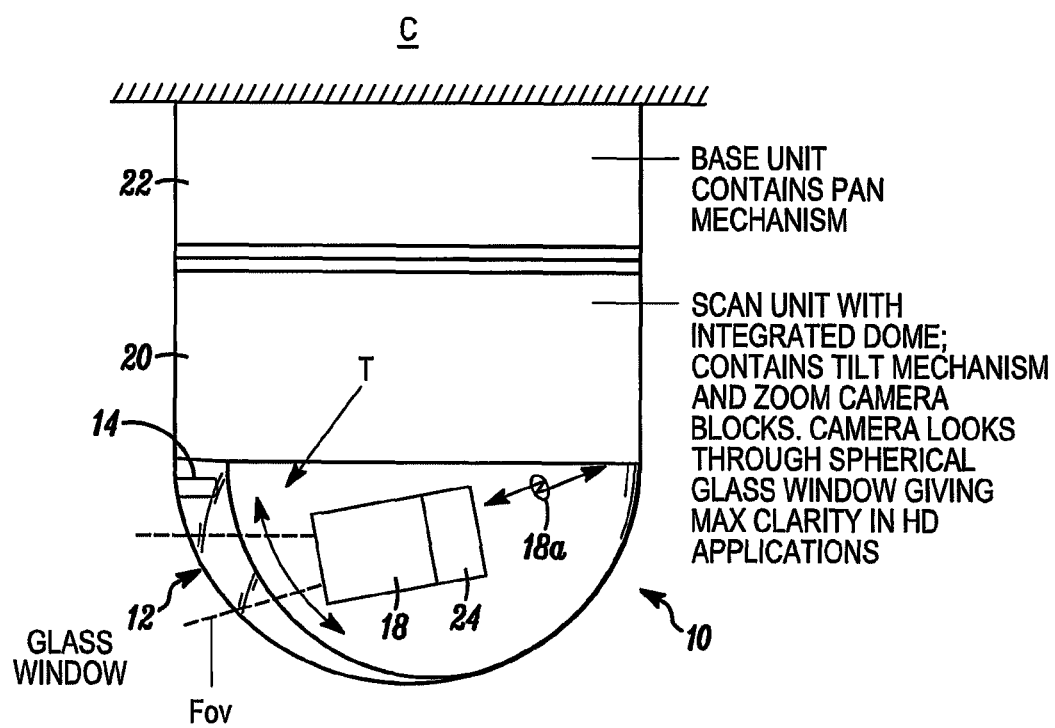
FIG. 2 is a side view illustrating additional aspects of the invention.

The glass window 12 provides a high quality, optical, observation port for a camera 18 carried in the dome 10, see FIG. 2. The camera 18 is tiltable over a range T and can be zoomed as needed using a tilt and zoom mechanism 20 which carries the housing 10.

Because the window 12 is in the field of view FOV, see FIG. 2, of the camera 18 throughout the tilt range T, the images from the camera 18, wired or wireless 18a, exhibit greater clarity than if the window was formed of a transparent plastic material.

A base unit 22, which could be mounted on a ceiling C, or a pendant mount or a Soffit mount, contains a pan mechanism 22 which rotates the tilt/zoom mechanism 20 in combination with the housing 10. Control circuits 24 can be coupled to camera 18 to process image information and to carry out some or all of the zoom function as would be understood by those of skill in the art.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A camera assembly comprising:
   a multi-material camera housing having at least a transparent glass window;
   a camera in the housing with a field of view that intersects the window;
   a zoom mechanism carrying the housing; and
   a panning mechanism that rotates the zoom mechanism and the camera in combination with the housing.

2. An assembly as in claim 1 where the housing is one of, substantially dome shaped, substantially cylindrically shaped, substantially square, or substantially rectangular.

3. An assembly as in claim 1 where the housing carries a tilt mechanism coupled to the camera.

4. An assembly as in claim 1 where the housing includes another material selected from a class which includes at least glass, metal, and plastic.

5. An assembly as in claim 1 where the window exhibits a selected curvature.

6. An assembly as in claim 5 where the housing is substantially dome shaped.

7. An assembly as in claim 6 where the housing carries at least a tilt mechanism coupled to the camera.

8. An assembly as in claim 1 where the housing carries a heating element.

9. An assembly as in claim 8 where the heating element is carried on the window.

10. An assembly as in claim 1 where the window is selected from a class which includes, at least, a curved widow, a cylindrical window, a flat window, and a conic window.

11. A modular camera unit comprising:
    a housing which is partly formed of at least one of metal or plastic, and which includes a transparent glass window;

a tiltable camera carried in the housing where a field of view of the camera intersects the window throughout a tilt range;

a zoom mechanism which carries the housing; and a panning mechanism, the mechanism is coupled to the zoom mechanism and rotates the zoom mechanism, the housing, and the tiltable camera together substantially simultaneously.

12. A unit as in claim 11 where the window is selected from a class which includes, at least, a curved widow, a cylindrical window, a flat window, and a conic window.

13. A unit as in claim 12 which includes a heating element carried on the window.

14. A unit as in claim 12 which includes control circuits carried in the housing, the control circuits transmit, one of wired or wirelessly, images from the camera to a displaced site.

* * * * *